US012532125B2

(12) United States Patent
Ito et al.

(10) Patent No.: US 12,532,125 B2
(45) Date of Patent: Jan. 20, 2026

(54) SPEAKER

(71) Applicant: Alps Alpine Co., Ltd., Tokyo (JP)

(72) Inventors: Ryo Ito, Fukushima (JP); Yuji Saito, Fukushima (JP); Katsuhiko Egami, Fukushima (JP); Hiroki Toita, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 165 days.

(21) Appl. No.: 18/519,506

(22) Filed: Nov. 27, 2023

(65) Prior Publication Data

US 2024/0187793 A1 Jun. 6, 2024

(30) Foreign Application Priority Data

Dec. 1, 2022 (JP) ................................ 2022-193041

(51) Int. Cl.
*H04R 9/06* (2006.01)
*H04R 9/02* (2006.01)
*H04R 9/04* (2006.01)

(52) U.S. Cl.
CPC ............ *H04R 9/027* (2013.01); *H04R 9/045* (2013.01); *H04R 9/06* (2013.01)

(58) Field of Classification Search
CPC .......... H04R 9/027; H04R 9/045; H04R 9/06; H04R 9/025; H04R 3/002
USPC ......................... 381/191, 400, 401, 412, 413
See application file for complete search history.

(56) References Cited

U.S. PATENT DOCUMENTS

| | | | | |
|---|---|---|---|---|
| 5,828,767 | A | 10/1998 | Button | |
| 2023/0124537 | A1* | 4/2023 | Chiu | H04R 1/2838 381/431 |

FOREIGN PATENT DOCUMENTS

| | | | |
|---|---|---|---|
| JP | S54 76132 | A | 6/1979 |
| JP | 1993-227593 | A | 9/1993 |
| JP | 2000-197189 | A | 7/2000 |
| JP | 2022 087577 | A | 7/2000 |
| WO | WO 2022/203091 | A1 | 9/2022 |

OTHER PUBLICATIONS

Extended European Search Reprot from European Application No. 23212428.9, Apr. 4, 2024, 7 pgs.

* cited by examiner

*Primary Examiner* — George C Monikang
(74) *Attorney, Agent, or Firm* — Crowell & Moring LLP

(57) ABSTRACT

A magnetic circuit section having a main magnetic gap and sub-magnetic gaps is used. A vibrator is vibrated by an electromagnetic force generated by a voice current, which flows through a voice coil and a magnetic flux crossing the main magnetic gap. When the voice coil approaches or enters a sub-magnetic gap, the voice current which flows through the voice coil is reversed, temporarily cut-off or attenuated.

10 Claims, 10 Drawing Sheets

SPEAKER

RELATED APPLICATION

The present application claims priority to Japanese Patent Application No. 2022-193041, filed Dec. 1, 2022, the entirety of which is herein incorporated by reference.

BACKGROUND

1. Field

The present disclosure relates to a speaker that has a main magnetic gap and an additional at least one sub-magnetic gap, and magnetic fluxes cross the main magnetic gap and the sub-magnetic gap in opposite directions.

2. Description of the Related Art

JP 2000-197189 A and JP 5-227593 A mentioned below each present a speaker provided with a magnetic circuit section having two magnets. The speaker described in FIG. 2 of JP 2000-197189 A is provided with two ring-shaped magnets in the vertical direction, which is the vibration direction of a voice coil. A plate is interposed between the S-poles of the two ring-shaped magnets, a plate is provided in the N-pole on the top surface of the upper ring-shaped magnet, and a plate is provided in the N-pole on the bottom surface of the lower ring-shaped magnet. A central magnetic gap is formed between the plate located in the middle of the two ring-shaped magnets and a center pole, an upper magnetic gap is formed between the plate located on the top surface of the upper ring-shaped magnet and the center pole, and a lower magnetic gap is formed between the plate located on the bottom surface of the lower ring-shaped magnet and the center pole. A voice coil that provides a vibration force to a vibration plate is driven up and down with respect to the inside of the central magnetic gap.

In the speaker described in JP 5-227593 A, a ring-shaped center plate is fixed onto a ring-shaped main magnet, and a ring-shaped sub-magnet is stacked on the center plate. The main magnet and the sub-magnet are magnetized in vertically opposite directions, and the magnetic poles with the same polarity of the main magnet and the sub-magnet are opposed to the center plate. A magnetic gap is formed between the center plate and the center pole, and a magnetic gap is also formed between a top plate provided on the sub-magnet and the center pole. The voice coil is driven up and down with respect to the inside of the magnetic gap between the center plate and the center pole. In the speaker shown in FIG. 3 and FIG. 4, the voice coil is provided with a first winding portion located in the magnetic gap between the center plate and the center pole, and a second winding portion located further above the top plate and the center pole. The direction of current is the same between the first winding portion and the second winding portion. The speaker is such that when the voice coil is significantly moved downward, the second winding portion reaches the inside of the magnetic gap between the top plate and the center pole, thus a driving force that pushes the voice coil upward is applied to the voice coil, thereby preventing bottoming of the voice coil.

SUMMARY

For in-vehicle audio devices, a subwoofer to reproduce bass tones is used. In order to effectively reproduce sound in the bass range by a subwoofer or the like, it is necessary to produce an effective sound pressure by driving a vibration plate with a large area, and to do so, a great driving force needs to be applied to the voice coil. As in the speaker described in JP 2000-197189 A and JP 5-227593 A, the structure that causes a magnetic flux to be concentrated in the central magnetic gap using two magnets is effective as a way to reproduce sound in the bass range by driving a vibration plate with a large area.

However, when sound in the bass range is reproduced by a speaker such as a subwoofer, it is necessary to ensure the linearity of the driving force in order to operate a vibration plate having a large area, with a large amplitude, and if the linearity cannot be ensured, distortion is likely to occur in reproduction of the bass range. In the speaker described in JP 2000-197189 A, the transverse direction of the magnetic flux in the central magnetic gap is opposite to the transverse direction of the magnetic flux in the upper magnetic gap and the lower magnetic gap. Thus, when the amplitude of the vibration plate is increased, and the voice coil approaches or enters the upper magnetic gap or the lower magnetic gap, a braking force acts on the voice coil by a magnetic flux in an opposite direction in these magnetic gaps, and a driving force in an opposite direction further acts on the voice coil. Consequently, the linearity of the driving force acting on the vibration plate is impaired, and distortion or the like is likely to occur in reproduced sound in the bass range.

Also, in the speaker described in JP 5-227593 A, when the first winding portion of the voice coil approaches or enters the upper magnetic gap formed between the top plate and the center pole, a braking force acts on the voice coil. Furthermore, in the structure provided with the second winding portion, when the voice coil is driven downward, a great braking force acts on the voice coil by an electromagnetic force acting on the second winding portion, which is likely to have an adverse effect on reproduced sound quality in the bass range. The speaker described in JP 2000-197189 A and JP 5-227593 A may be suitable for reproduction of sound in the midrange or the treble range, in which the amplitude of the vibration plate is small, but is not suitable as a speaker, such as a subwoofer, that reproduces sound in the bass range by driving the vibration plate having a large area, with a large amplitude.

The present disclosure has been made to address the above-mentioned existing problem, among others, and it is an object of the present disclosure to provide a speaker that enables effective production of a magnetic driving force using a magnetic circuit section having a plurality of magnetic gaps, and that ensures the linearity of the driving force to be able to generate reproduced sound with less distortion.

In one aspect, the present disclosure provides a speaker including a vibrator having a vibration plate and a voice coil, a magnetic circuit section configured to form a magnetic flux crossing the voice coil, and a detector configured to detect a movement of the vibrator.

The magnetic circuit section is provided with two magnets disposed with a space in a vibration direction of the voice coil, a main magnetic gap formed in a middle between the two magnets, and a sub-magnetic gap formed spaced from the main magnetic gap with at least one of the magnets interposed between the gaps. Between the main magnetic gap and the sub-magnetic gap, directions of magnetic fluxes crossing the voice coil movable inside the gaps are opposite. A vibration controller is configured to reverse a direction of a current applied to the voice coil, when the detector detects that the voice coil has moved a predetermined distance from the main magnetic gap to the sub-magnetic gap.

In another aspect, the vibration controller may include a reverser configured to reverse the direction of current, and a corrector configured to correct the current amount.

The speaker of the present disclosure reverses the direction of current, for example, when the central portion of the voice coil in the vibration direction reaches the intermediate position, between the main magnetic gap and the sub-magnetic gap.

Furthermore, in another aspect, a speaker includes a vibrator having a vibration plate and a voice coil, a magnetic circuit section configured to form a magnetic flux crossing the voice coil, and a detector configured to detect a movement of the vibrator.

The magnetic circuit section is provided with two magnets disposed with a space in a vibration direction of the voice coil, a main magnetic gap formed in a middle between the two magnets, and a sub-magnetic gap formed and spaced from the main magnetic gap with at least one of the magnets interposed between the gaps. Between the main magnetic gap and the sub-magnetic gap, directions of magnetic fluxes crossing the voice coil movable inside the gaps are opposite. A vibration controller is configured to temporarily cut-off or attenuate a current applied to the voice coil, when the detector detects that the voice coil has moved a predetermined distance from the main magnetic gap to the sub-magnetic gap.

The vibration controller may include a corrector configured to correct the current amount.

In another aspect, the speaker temporarily cuts-off or attenuates the current, for example, when the central portion of the voice coil in the vibration direction reaches the intermediate position, between the main magnetic gap and the sub-magnetic gap.

A speaker according to the present disclosure can be configured so that the magnetic circuit section has a first sub-magnetic gap formed with a space in one vibration direction and a second sub-magnetic gap formed with a space in the other vibration direction with the main magnetic gap between the first sub-magnetic gap and the second sub-magnetic gap. A direction of a magnetic flux crossing each of the first sub-magnetic gap and the second sub-magnetic gap is opposite to a direction of a magnetic flux crossing the main magnetic gap. Control by the vibration controller is performed not only when the voice coil has moved a predetermined distance from the main magnetic gap to the first sub-magnetic gap, but also when the voice coil has moved a predetermined distance from the main magnetic gap to the second sub-magnetic gap.

In another aspect, the magnetic circuit section is provided with two magnets, and the magnetic flux generated by the two magnets is concentrated in the main magnetic gap. Thus, the density of the magnetic flux crossing the voice coil is increased, and for example, even with a vibration plate having a large area for the bass range, the voice coil can be vibrated by a great driving force. When the amplitude of the vibration plate is increased, and the voice coil approaches or enters the sub-magnetic gap, no braking force acts on the voice coil, and a force in the original vibration direction secondarily acts on the voice coil instead. Thus, the linearity of the driving force can be maintained, and reproduced sound quality with less distortion can be obtained.

When the amplitude of the vibration plate is increased, and the voice coil approaches or enters the sub-magnetic gap, the current flowing through the voice coil is attenuated or temporarily cut-off, thereby making it possible to prevent a braking force from acting on the voice coil. Due to this, the linearity of the driving force can be maintained, and reproduced sound quality with less distortion can be obtained.

DESCRIPTION OF THE PREFERRED EMBODIMENTS

Figure 1:
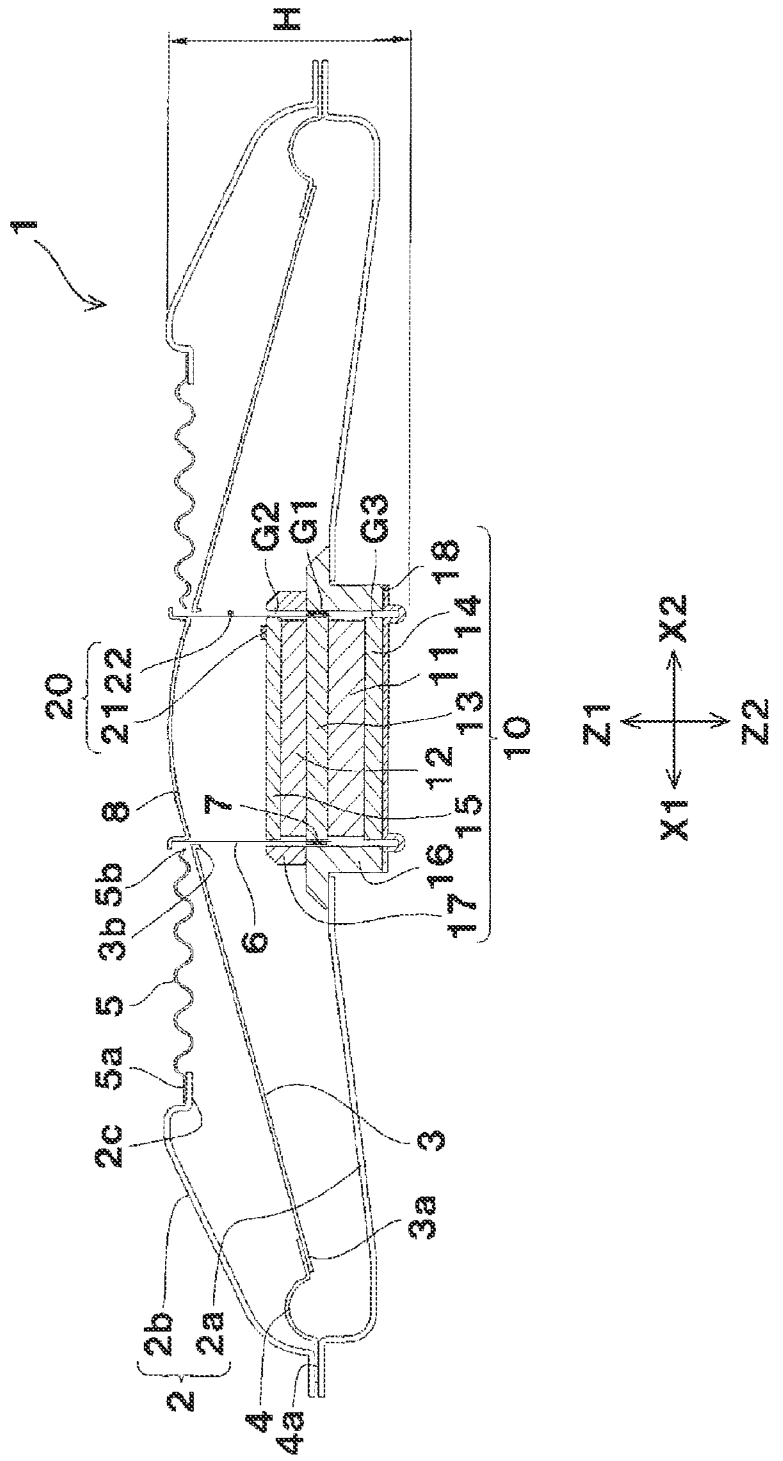
FIG. 1 is a cross-sectional view showing a speaker in a first embodiment of the present disclosure.
Figure 3:
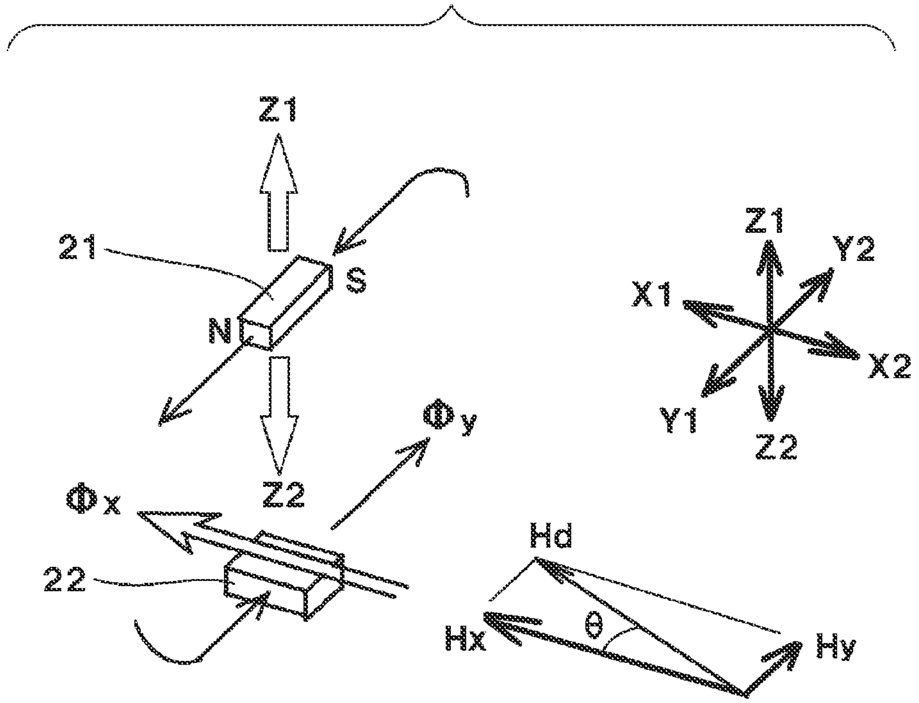
FIG. 3 is an explanatory view showing the configuration of a detector.
Figure 12:
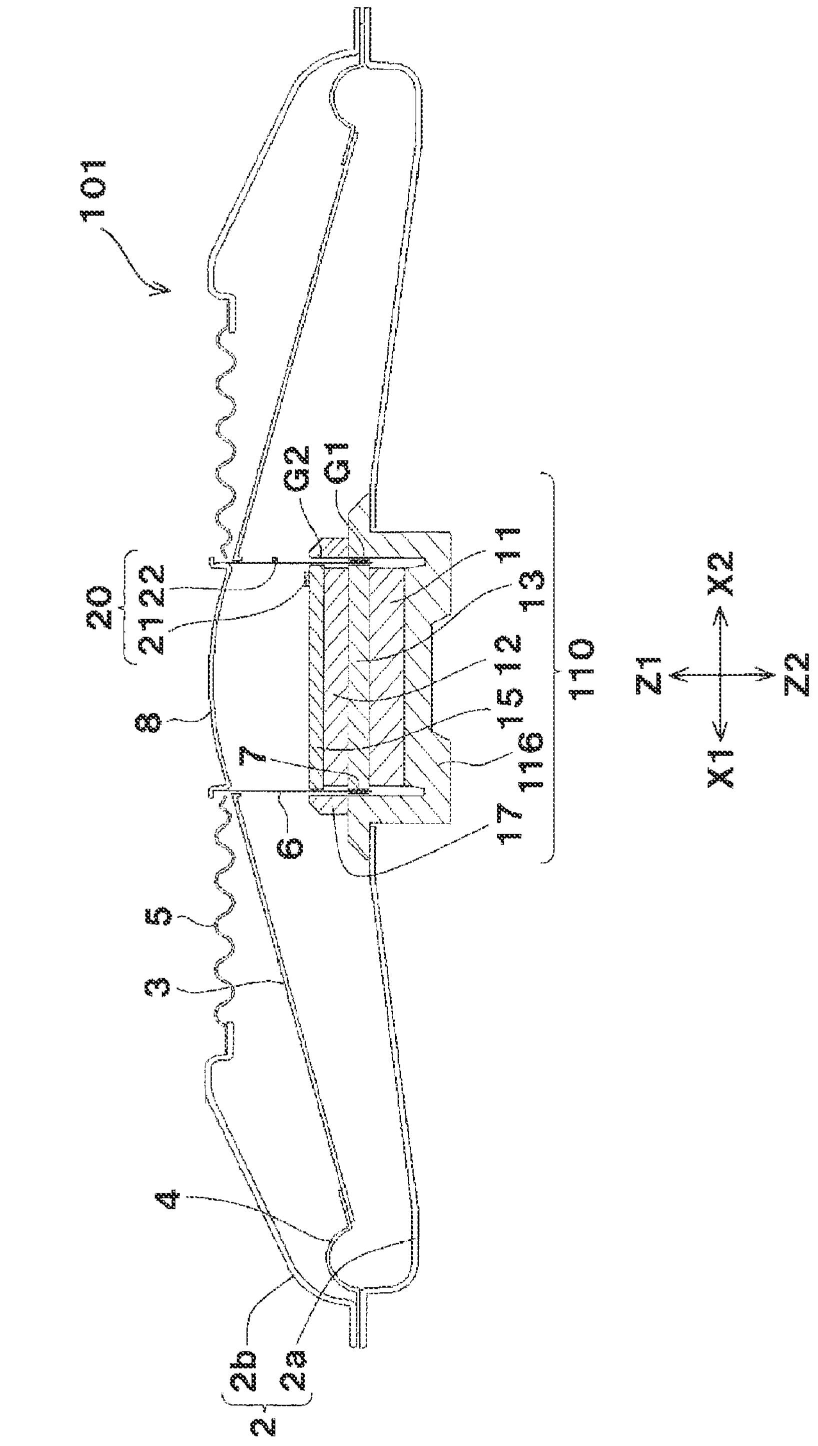
FIG. 12 is a cross-sectional view of a speaker in a third embodiment of the present disclosure.

The speaker shown in FIG. 1 and FIG. 12 is a subwoofer having a resonance frequency around 50 Hz, which constitutes, for example, part of an in-vehicle audio device, and is provided in the inside of the back seat. However, the speaker of the present disclosure can also be used for a purpose other than in-vehicle use. The speaker of the present disclosure is suitable for driving a vibration plate having a large area, with a large amplitude in the bass range. However, the speaker of the present disclosure can also be used for producing sound in the midrange, and in this case, the magnetic circuit section has a better drive efficiency, thus a thin speaker having a favorable linearity of the driving force can be constructed. In FIG. 1 and FIG. 12, the Z1-Z2 direction is the vertical direction that is the vibration direction of the voice coil. The Z1 direction is upward (or forward), the Z2 direction is downward (or backward), and one of the Z1 direction and the Z2 direction is the primary sound production direction. The X1-X2 direction is the traverse direction when a cross section is viewed. In FIG. 3, the longitudinal direction perpendicular to both the vertical direction (Z1-Z2 direction) and the traverse direction (X1-X2 direction) is shown as the Y1-Y2 direction.

A speaker 1 shown in FIG. 1 in a first embodiment of the present disclosure has a frame 2. The frame 2 is composed of a non-magnetic material or a magnetic material, and is formed by combining a lower frame 2*a* and an upper frame 2*b*. The frame 2 is circular when viewed from above. A vibration plate 3 is provided inside the frame 2. The vibration plate 3 has a conical shape, that is, so-called cone shape. An elastically deformable edge member 4 is bonded to an outer peripheral end 3*a* of the vibration plate 3 by adhesives. An outer peripheral end 4*a* of the edge member 4 is interposed and fixed between the lower frame 2*a* and the upper frame 2*b*. The lower frame 2*a* and the upper frame 2*b* are fixed to each other by screws with the outer peripheral end 4*a* of the edge member 4 interposed therebetween.

A cylindrical coil bobbin 6 is provided inside the frame 2. An inner peripheral end 3*b* of the vibration plate 3 is fixed to the outer peripheral surface of the coil bobbin 6 by adhesives. An outer periphery 5*a* of an elastically deformable damper member 5 having a corrugated cross section is fixed to an opening edge 2*c* at an upper portion of the upper frame 2*b* by adhesives. An inner periphery 5*b* of the damper member 5 is fixed to the outer peripheral surface of the coil bobbin 6 by adhesives. A cap 8 that covers a front opening of the coil bobbin 6 is bonded and fixed to the central portion of the vibration plate 3. The outer peripheral surface of a lower portion of the coil bobbin 6 is provided with a voice coil 7. The coated conductor wire forming the voice coil 7 is wound a predetermined number of turns on the outer peripheral surface of the coil bobbin 6.

The vibration plate 3, the coil bobbin 6, and the voice coil 7 are supported vibratably in the vertical direction (Z1-Z2 direction) with respect to the frame 2 by elastic deformation of the edge member 4 and the damper member 5. The vibration plate 3, the cap 8, the coil bobbin 6, and the voice coil 7 constitute a vibrator that vibrates in the front-back direction with respect to a drive supporter including the frame 2.

A magnetic circuit section 10 is fixed to the central portion of the lower frame 2*a* by a method such as adhesion or screwing. The frame 2 and the magnetic circuit section 10 constitute a drive supporter that vibratably supports the vibrator.

The magnetic circuit section 10 is for generating a magnetic flux that crosses the voice coil 7. The magnetic circuit section 10 is provided with a disk-shaped first magnet 11 and a second magnet 12 with a space in the vibration direction (Z1-Z2 direction) of the voice coil 7. The magnetic circuit section 10 is a so-called internal magnetic type, and the two disk-shaped magnets 11, 12 are installed inside the cylindrical coil bobbin 6. In the internal magnetic circuit section 10, no magnet is present outside the coil bobbin 6, thus the outer periphery of the coil bobbin 6 has a small projection portion. Thus, the vibration plate 3 which vibrates vertically is unlikely to come into contact with the magnetic circuit section 10, and even if the vertical height dimension H of the speaker 1 is reduced, a large space for the amplitude of the vibration plate 3 can be ensured. Note that the speaker of the present disclosure may be a so-called external magnetic type, in which magnets are provided on the outer peripheral side of the coil bobbin 6. The magnetic circuit section 10 of the present disclosure may be further provided with one or more magnets in addition to the two magnets 11, 12.

Figure 2:
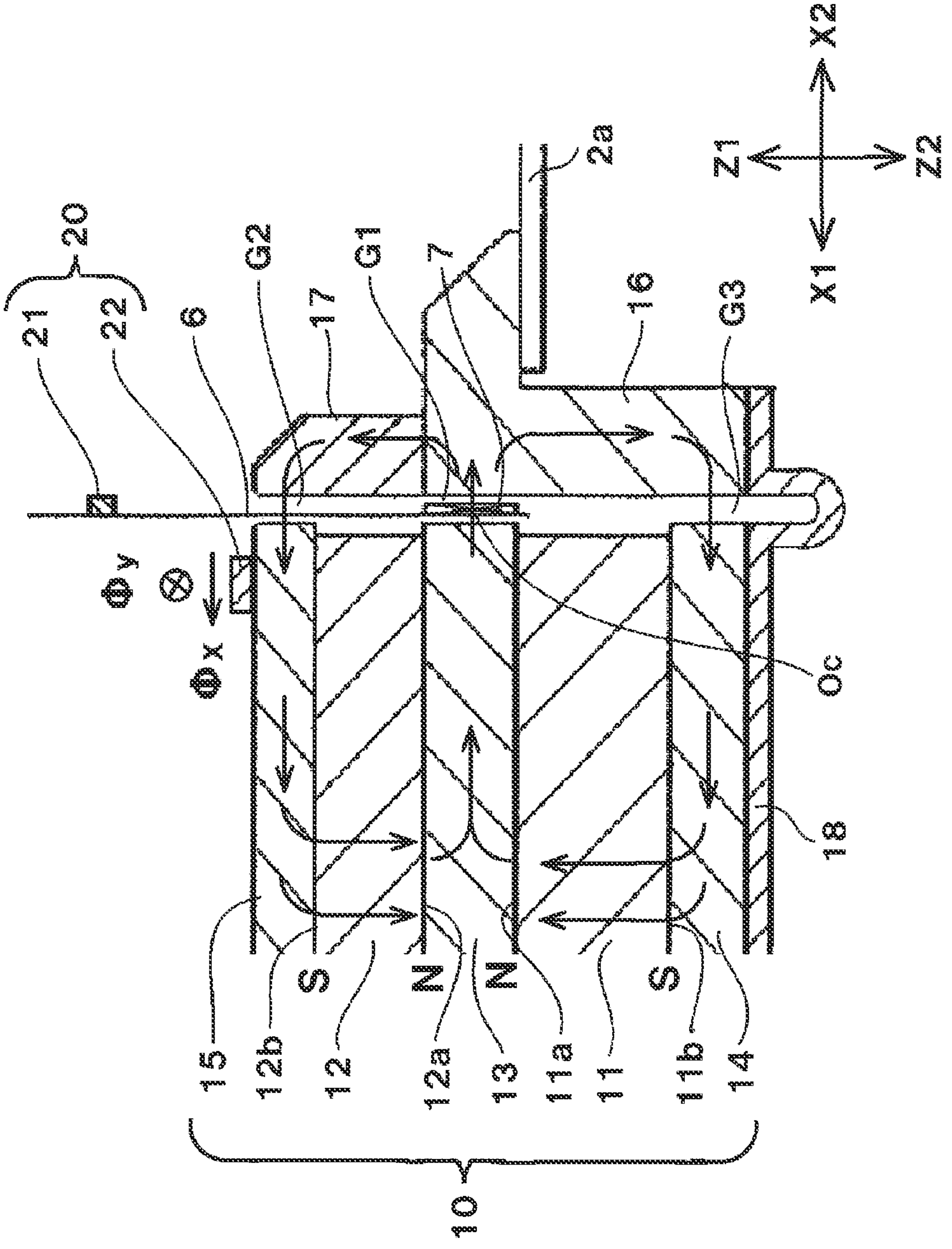
FIG. 2 is a partially enlarged cross-sectional view showing part of the speaker in the first embodiment in an enlarged manner.

As also shown in FIG. 2, in the magnetic circuit section 10, a central plate 13 is interposed between an upper surface 11*a* of the first magnet 11 and a lower surface 12*a* of the second magnet 12. Furthermore, a bottom plate 14 is stacked on a lower surface 11*b* of the first magnet 11, and a top plate 15 is stacked on an upper surface 12*b* of the second magnet 12. The central plate 13, the bottom plate 14 and the top plate 15 each have a disk shape slightly greater than the magnets 11, 12 in diameter, and are composed of a magnetic metal material containing iron as a main component. The magnetic circuit section 10 has a cylindrical outer peripheral yoke 16, and a ring-shaped upper yoke 17 stacked on the outer peripheral yoke 16. The outer peripheral yoke 16 and the upper yoke 17 are composed of a magnetic metal material containing iron as a main component. The bottom of the magnetic circuit section 10 is provided with a support member 18 composed of a non-magnetic material, and the bottom plate 14 and the outer peripheral yoke 16 are fixed to the support member 18.

As shown in an enlarged manner in FIG. 2, a main magnetic gap G1 is formed between the outer peripheral surface of the central plate 13 and the inner peripheral surface of the outer peripheral yoke 16. A first sub-magnetic gap G2 is formed between the outer peripheral surface of the top plate 15 and the inner peripheral surface of the upper yoke 17, and a second sub-magnetic gap G3 is formed between the outer peripheral surface of the bottom plate 14 and the inner peripheral surface of the outer peripheral yoke 16. The main magnetic gap G1 and the first sub-magnetic gap G2 are positioned side by side, with a space in the vibration direction of the voice coil 7 with the second magnet 12 interposed between the gaps G1, G2. The main magnetic gap G1 and the second sub-magnetic gap G3 are positioned side by side with a space in the vibration direction of the voice coil 7 with the first magnet 11 interposed between the gaps G1, G3. The voice coil 7 vibrates up and down with respect to the inside of the main magnetic gap G1, and when the vibration occurs, the voice coil 7 may approach the inside of the first sub-magnetic gap G2 and the second sub-magnetic gap G3, and may further move along the inside.

As shown in FIG. 2, the first magnet 11 is magnetized so that the upper surface 11*a* and the lower surface 11*b* have opposite polarities, and the second magnet 12 is also magnetized so that the lower surface 12*a* and the upper surface 12*b* have opposite polarities. The upper surface 11*a* of the first magnet 11 and the lower surface 12*a* of the second magnet 12 have the same polarity, and the lower surface 11*b* of the first magnet 11 and the upper surface 12*b* of the second magnet 12 have the same polarity. In the embodiment shown in FIG. 2, the upper surface 11*a* and the lower surface 12*a* are each the N-pole, and the lower surface 11*b* and the upper surface 12*b* are each the S-pole. FIG. 2 shows the directions of the magnetic fluxes that flow through the inside of the magnetic circuit section 10. The magnetic fluxes from the two lower and upper magnets 11, 12 are concentrated to the central plate 13, thus the magnetic field crossing the main magnetic gap G1 formed between the outer peripheral surface of the central plate 13 and the inner peripheral surface of the outer peripheral yoke 16 has a high magnetic flux density. Since a magnetic flux also flows through the bottom plate 14 and the top plate 15, a magnetic flux crosses the first sub-magnetic gap G2 formed between the outer peripheral surface of the top plate 15 and the inner peripheral surface of the upper yoke 17, and a magnetic flux crosses the second sub-magnetic gap G3 formed between the outer peripheral surface of the bottom plate 14 and the inner peripheral surface of the outer peripheral yoke 16. The transverse direction of the magnetic flux through the sub-magnetic gaps G2, G3 is opposite to the transverse direction of the magnetic flux at the main magnetic gap G1.

The speaker 1 is provided with a detector (vibration detector) 20 that detects a movement of the vibrator. The details of the detector 20 are shown in FIG. 3. The detector 20 is constituted by a movable magnet 21 fixed to the coil bobbin 6 which is part of the vibrator, and a magnetic sensor 22 fixed to the magnetic circuit section 10 which is part of the drive supporter. In the detector 20, a magnetic flux leakage component from the upper yoke 17 to the top plate 15 crossing through the first sub-magnetic gap G2 in the magnetic circuit section 10 is applied to the magnetic sensor 22 in the X1 direction as a fixed magnetic flux component Φx. The movable magnet 21 is magnetized so that the N-pole points in the Y1 direction, and the S-pole points in the Y2 direction. A movable magnetic flux component Φy which is a leakage magnetic flux from the movable magnet 21 is applied to the magnetic sensor 22 in the Y2 direction. The magnetic flux density of the fixed magnetic flux component Φx is constant, whereas the magnetic flux density of the movable magnetic flux component Φy varies with the vibration of the vibrator. When the movable magnet 21 approaches the magnetic sensor 22, the magnetic flux density of the movable magnetic flux component Φy increases, and when the movable magnet 21 moves away from the magnetic sensor 22, the magnetic flux density of the movable magnetic flux component Φy decreases.

The magnetic sensor 22 has at least one magnetoresistive element. The magnetoresistive element is a GMR element or a TMR element which has a fixed magnetic layer and a free magnetic layer. Although the direction of magnetization of the fixed magnetic layer is fixed, the direction of magnetization of the free magnetic layer varies with the direction of a magnetic field applied from the outside. In a GMR element or a TMR element, an electrical resistance value changes due to the MR effect according to the change in the relative angle between the direction of magnetization fixed in the fixed magnetic layer and the direction of magnetization of the free magnetic layer. In FIG. 3, magnetic field Hx applied to the magnetic sensor 22 in the X1 direction based on the fixed magnetic flux component Φx, and magnetic field Hy applied to the magnetic sensor 22 in the Y2 direction based on the movable magnetic flux component Φy are both represented as vector quantities. The magnetization of the free magnetic layer of the magnetic sensor 22 follows the direction of a detected magnetic field Hd which is the composite vector of the magnetic field Hx and the magnetic field Hy. Thus, the angle θ of the detected magnetic field Hd which is the composite vector can be known from the electrical resistance value of the magnetic sensor 22. This is equivalent to knowing the change in the magnitude of the magnetic field Hy with respect to the magnetic field Hx, and the change in vertical position of the movable magnet 21 can be known from the change in the resistance value of the magnetic sensor 22.

Note that two hall elements may be disposed as the magnetic sensor 22 so that their detection directions are the X-direction and the Y-direction. This also enables measurement of the change in the magnitude of the magnetic field Hy with respect to the magnetic field Hx. Various methods such as an optical method can be utilized by the detector 20 to detect the change in the vibration of the vibrator.

Figure 4:
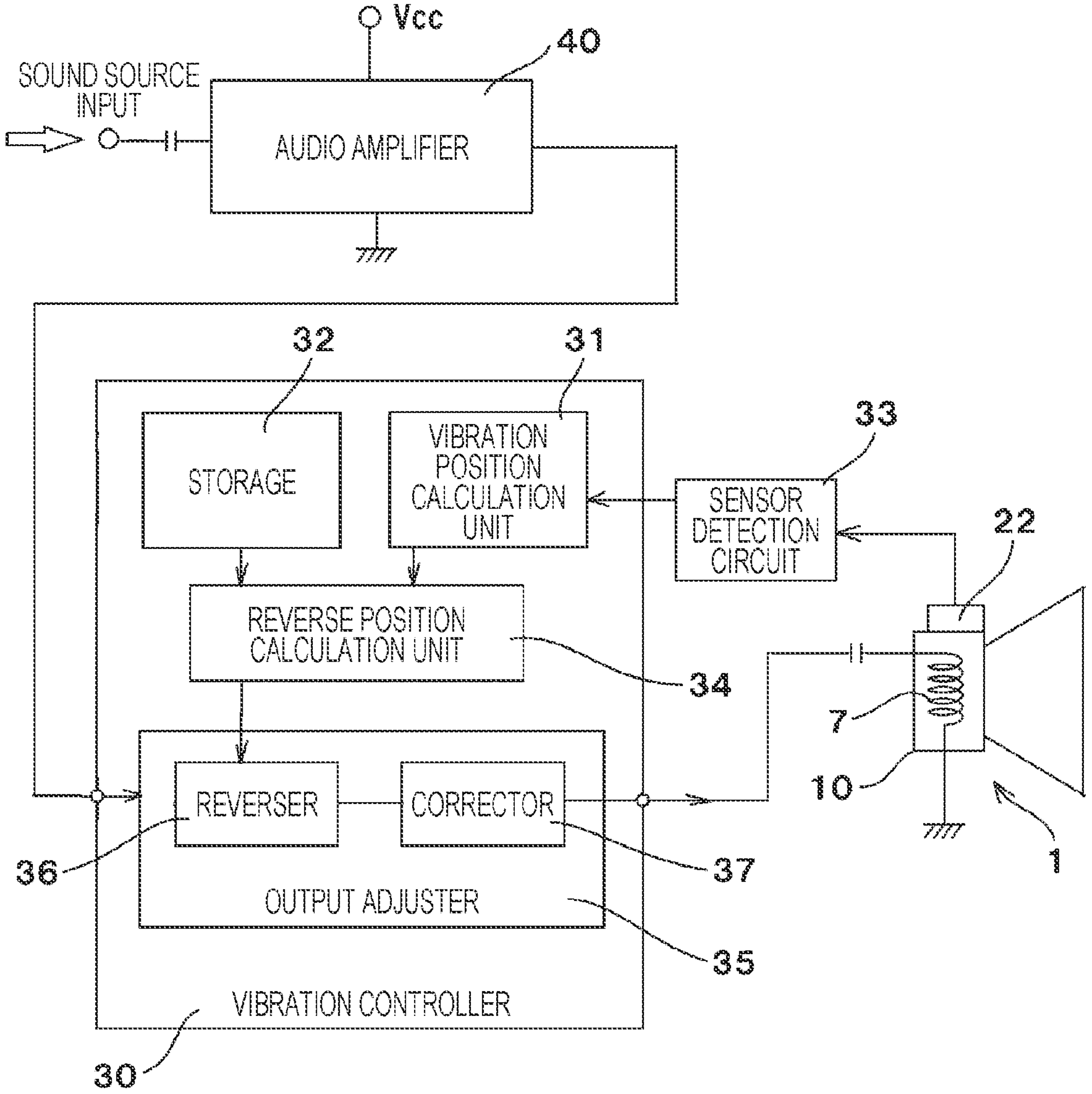
FIG. 4 is a circuit block diagram including the speaker in the first embodiment.

FIG. 4 shows the configuration of a vibration controller 30 that controls the operation of the speaker 1. The vibration controller 30 is primarily comprised of a memory and a CPU, and performs a process based on pre-installed software, for example. The vibration controller 30 may be incorporated in an audio amplifier 40, or mounted independently on a circuit board installed inside the frame 2 of the speaker 1, separately from the audio amplifier 40.

The vibration controller 30 has a region that serves as a vibration position calculation unit 31. The vibration controller 30 is accompanied by a sensor detection circuit 33. The sensor detection circuit 33 generates a detection output based on the resistance change of the magnetic sensor 22, and the detection output is provided to the vibration position calculation unit 31. The region serving as a storage 32 stores information on: i) actual measurement value of the transverse magnetic flux through the main magnetic gap G1 and the sub-magnetic gaps G2, G3 in each individual speaker; ii) on measurement values of inductance of the voice coil 7 and relative position of the sub-magnetic gaps G2, G3 and the voice coil 7; and, iii) information based on these pieces of information, related to the correspondence between the magnitude of a braking force applied from the sub-magnetic gaps G2, G3 to the voice coil 7 and the position reached by the voice coil 7. In the region serving as the reverse position calculation unit 34, the timing when the current applied to the voice coil 7 should be reversed is calculated from the position of the movable magnet 21 calculated by the vibration position calculation unit 31, and the information on the characteristics of the speaker, stored in the storage 32. The vibration controller 30 is provided with a region that serves as an output adjuster 35, and a reverser 36 and a corrector 37 are provided in the region. The output adjuster 35 operates based on the calculation values from the reverse position calculation unit 34. The voice current output from the audio amplifier 40 is provided to the output adjuster 35, and the direction of the current is reversed at a timing based on the calculation values from the reverse position calculation unit 34. The reverser 36 is, for example, an inverter that reverses the direction (or phase) of the voice current. The corrector 37 is for correcting the value (current amount) of the reversed voice current, and is, for example, a limiter that controls and prevents the reversed voice current from becoming excessive.

Figure 5A:
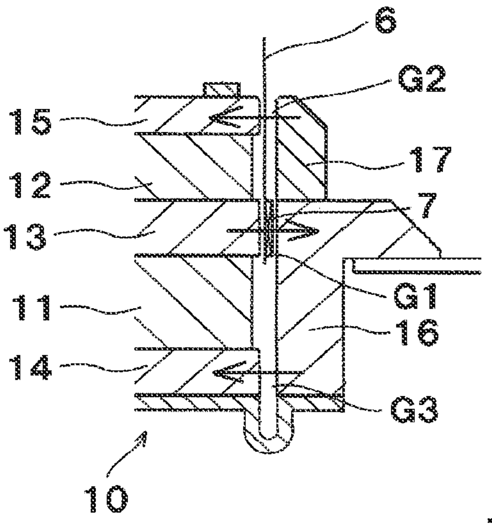
FIGS. 5A, 5B, 5C, 5D are partial cross-sectional views showing the change in the vibration position of a voice coil in a magnetic circuit section.

Next, the sound production operation of the speaker 1 will be described. FIG. 5A shows the reference position of the voice coil 7, and when energization is stopped, the voice coil 7 is at the reference position. In the voice coil 7 at the reference position, the vertical central portion Oc matches the vertical center of the main magnetic gap G1. When the sound production operation is started, the voice current is provided to the voice coil 7 based on the audio signal output from the audio amplifier 40. The vibrator including the voice coil 7, the coil bobbin 6, and the vibration plate 3 is vibrated in the vertical direction (Z1-Z2 direction) by an electromagnetic force which is excited by the magnetic flux crossing the main magnetic gap G1 and the voice current flowing through the voice coil 7, and a sound pressure according to the frequency of the voice current is provided from the vibration plate 3 to the space in the Z1 direction and the Z2 direction.

The speaker 1 in the first embodiment is a subwoofer having a resonance frequency around 50 Hz. The subwoofer has a large area of the vibration plate 3. Thus, in order to effectively reproduce sound in the bass range, the vibration plate 3 needs to be driven with a large amplitude. As shown in FIG. 2, the magnetic flux generated from the first magnet 11, and the magnetic flux generated from the second magnet 12, are concentrated in the central plate 13 of the magnetic circuit section 10. Thus, the magnetic flux density in the magnetic field crossing the main magnetic gap G1 is increased. Therefore, the driving force applied to the voice coil 7 is also increased, and reproduction output in the bass range can be obtained by efficiently vibrating the vibration plate 3 having a large area without using an excessively large magnetic circuit section 10.

FIGS. 5A, 5B, 5C, 5D show the change in position of the voice coil 7 in sequence when it is moved upward (Z1 direction) by an electromagnetic force acting on the voice coil 7. As the voice coil 7 is moved from the position of FIG. 5B to the position of FIGS. 5C, 5D, a reversed magnetic flux crossing the first sub-magnetic gap G2 starts to act on the voice coil 7. The direction of the magnetic flux crossing the first sub-magnetic gap G2 is opposite to the direction of the magnetic flux crossing the main magnetic gap G1 which contributes to sound production. Thus, as the voice coil 7 is moved from the position of FIG. 5B to the position of FIGS. 5C, 5D, a downward (Z2 direction) reaction force starts to act on the vibrator. When a reaction force acts on the vibrator which is driven by the voice current, distortion occurs in reproduced sound in the bass range, and quality of sound production deteriorates.

Thus, in the vibration controller 30 shown in FIG. 4, a timing to reverse the direction of the voice current is calculated by the reverse position calculation unit 34 based on the position of the voice coil 7 calculated by the vibration position calculation unit 31, and the behavior information specific to the speaker 1, stored in the storage 32. The output adjuster 35 operates based on the calculation values from the reverse position calculation unit 34, and the voice current based on the audio signal output from the audio amplifier 40 is reversed by the reverser 36, then further corrected by the corrector 37, as needed. For example, as shown in FIG. 5C, when the central portion Oc of the upward moving voice coil 7 reaches the intermediate position between the main magnetic gap G1 and the first sub-magnetic gap G2, the direction of the voice current is reversed. When the voice current with the reversed direction (phase) is applied to the voice coil 7, a driving force in the same direction as the original behavior direction acts on the vibrator by the reversed voice current, and the magnetic flux crossing the first sub-magnetic gap G2. Consequently, the linearity of the driving force acting on the vibrator can be maintained, and the occurrence of distortion in reproduced sound in the bass range can be prevented. In addition, the operation of the vibrator can be optimized by the corrector 37 making necessary correction. An excessive acceleration can be prevented from acting on the vibrator, for example, by operating the corrector 37 as a limiter.

Figure 6:
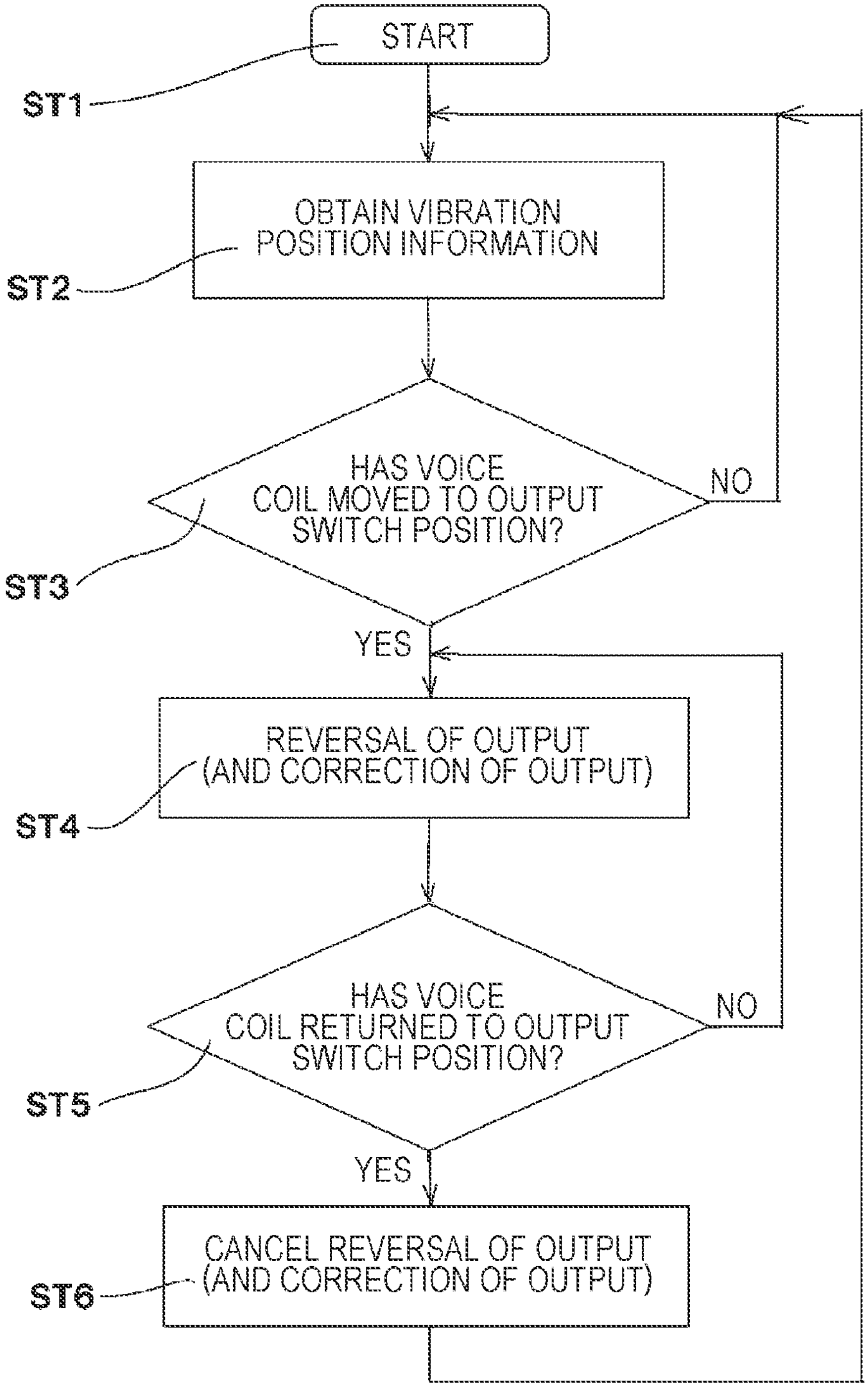
FIG. 6 is a flowchart showing the vibration control of the speaker in the first embodiment.

FIG. 6 shows a flowchart of the control operation performed by the vibration controller 30. In FIG. 6, each process step is represented by ST When reproduction of the bass range starts in ST1 (step 1), the process operation in the vibration controller 30 is started. Note that the frequency of sound source input from a sound source input may be monitored by the audio amplifier 40 shown in FIG. 4, and only when the audio signal contains a signal with a frequency in a predetermined bass range of e.g., several hundred Hz or less, the process operation of the vibration controller 30 may be started.

In ST2, the reverse position calculation unit 34 obtains vibration position information that is the calculation values from the vibration position calculation unit 31. In ST3, it is determined based on the vibration position information whether the voice coil 7 has moved from the main magnetic gap G1 toward the first sub-magnetic gap G2 to a predetermined output switch position. In ST3, when the voice coil 7 is determined to have moved to the output switch position, the flow proceeds to ST4, and an output reverse process is performed by the reverser 36, then output correction is further made by the corrector 37, as needed. In ST3, when the voice coil 7 is not determined to have moved to a predetermined output switch position, obtaining of the vibration location information in ST2 is continued. When the output reverse process is performed, the reverse position calculation unit 34 monitors in ST5 whether the voice coil 7 has moved downward, and returned to a predetermined output switch position toward the main magnetic gap G1. When the voice coil 7 has not returned to a predetermined output switch position, the output reverse process is continued, and when the voice coil 7 is determined to have returned to a predetermined output switch position, the flow proceeds to ST6, and the output reverse process is cancelled. Note that the output switch position in ST3 and the output switch position in ST5 may be the same position or may be different positions.

In FIG. 5 and FIG. 6, the process operation of the vibration controller 30 when the voice coil 7 moves from the main magnetic gap G1 to the first sub-magnetic gap G2 has been described, and the process operation of the vibration controller 30 when the voice coil 7 moves downward (Z2 direction), then moves from the main magnetic gap G1 to the second sub-magnetic gap G3 is also the same as above operation. The voice current provided to the voice coil 7 is controlled in a symmetric manner between when the voice coil 7 moves from the main magnetic gap G1 to the first sub-magnetic gap G2, and when the voice coil 7 moves from the main magnetic gap G1 to the second sub-magnetic gap G3.

Figure 7:
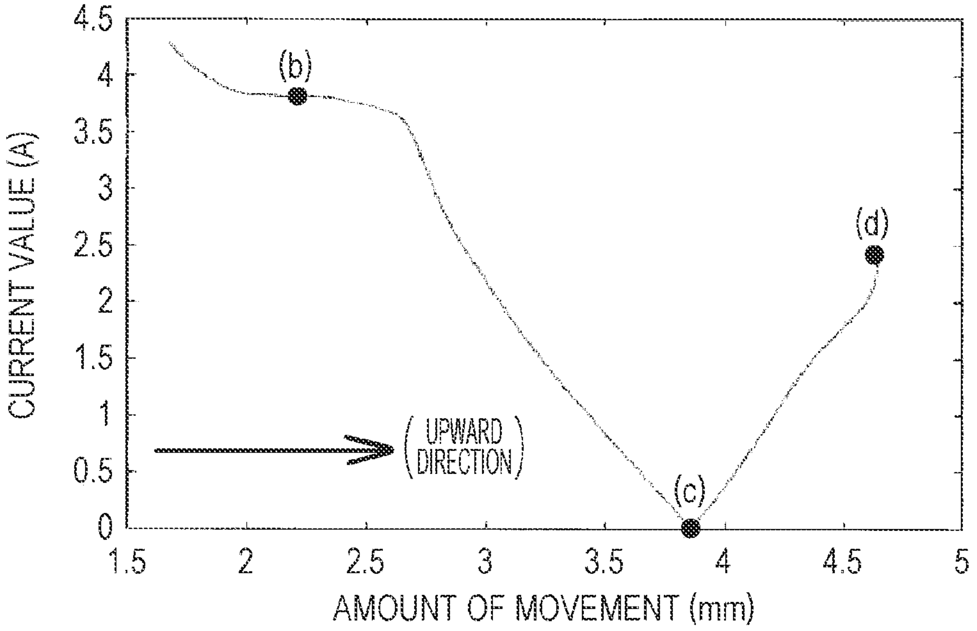
FIG. 7 is a line graph showing a relationship between the amount of movement of the voice coil and the current value when the voice coil vibrates as shown in FIGS. 5A, 5B, 5C, 5D.
Figure 8:
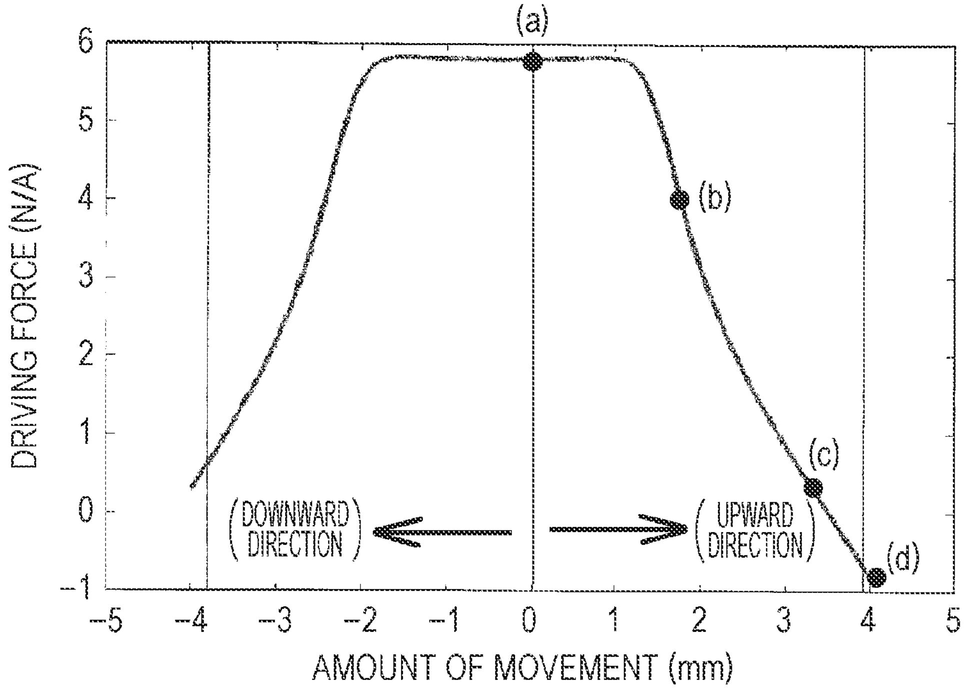
FIG. 8 is a line graph showing a relationship between the amount of movement of the voice coil and the driving force when the voice coil vibrates as shown in FIGS. 5A, 5B, 5C, 5D.

FIG. 7 shows an example of current control, and FIG. 8 shows the characteristics of the linearity of driving force when the current control shown in FIG. 7 is performed. FIG. 7 and FIG. 8 show simulation results. In FIG. 7, the horizontal axis indicates the amount of movement (mm) when the central portion Oc of the voice coil 7 moves upward, and the vertical axis indicates the current value (A) provided to the voice coil 7. In FIG. 8, the horizontal axis indicates the amount of movement (mm) when the central portion Oc of the voice coil 7 moves upward (Z1 direction) and the amount of movement (negative mm) when the central portion Oc moves downward (Z2 direction), and the vertical axis indicates, as an absolute value, the change in the driving force (N) per 1 A current, applied to the voice coil 7.

Figure 5B:
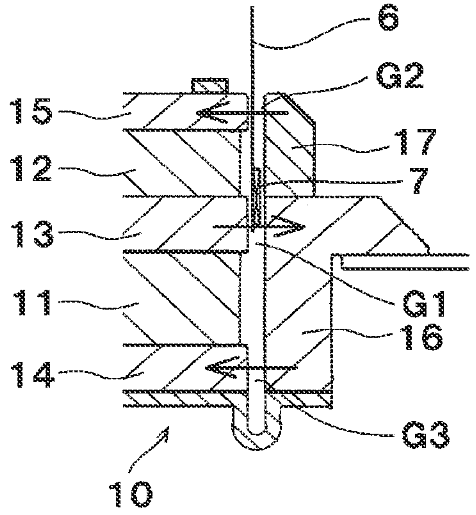
Figure 5B:
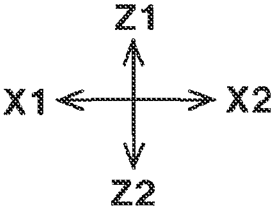
Figure 5C:
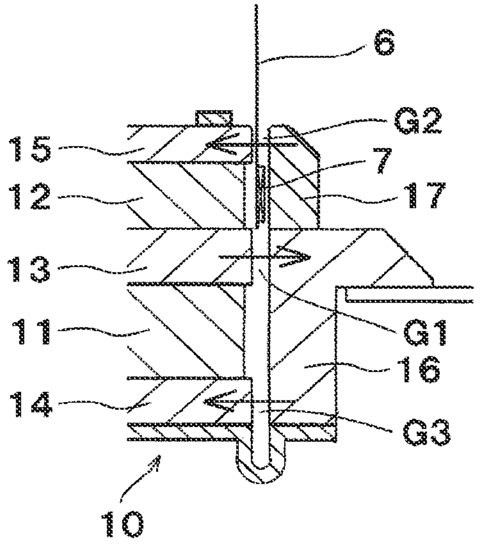
Figure 5D:
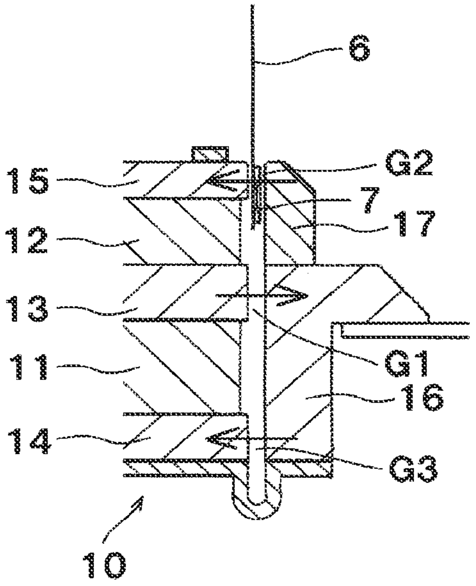

In the line graphs of FIG. 7 and FIG. 8, the movement position of the voice coil 7 as in FIG. 5A is indicated by (a), the movement position of the voice coil 7 as in FIG. 5B is indicated by (b), the movement position of the voice coil 7 as in FIG. 5C is indicated by (c), and the movement position of the voice coil 7 as in FIG. 5D is indicated by (d). In the current control in this simulation, when the central portion Oc of the voice coil 7 is at the position shown in FIG. 5C and has moved to the position corresponding to exactly half the movement distance from the main magnetic gap G1 to the first sub-magnetic gap G2, the voice current which flows through the voice coil 7 becomes zero instantaneously as shown by (c) in FIG. 7. Subsequently, while the voice coil 7 moves from the position of FIG. 5C to the position of FIG. 5D, as shown from (c) to (d) of FIG. 7, the direction of the current flowing through the voice coil 7 is reversed. As shown on the right side of the movement amount of zero in FIG. 8, it is seen that as a result of performing the current reverse control shown in FIG. 7, a simulation result is obtained with the linearity of driving force ensured.

Figure 9:
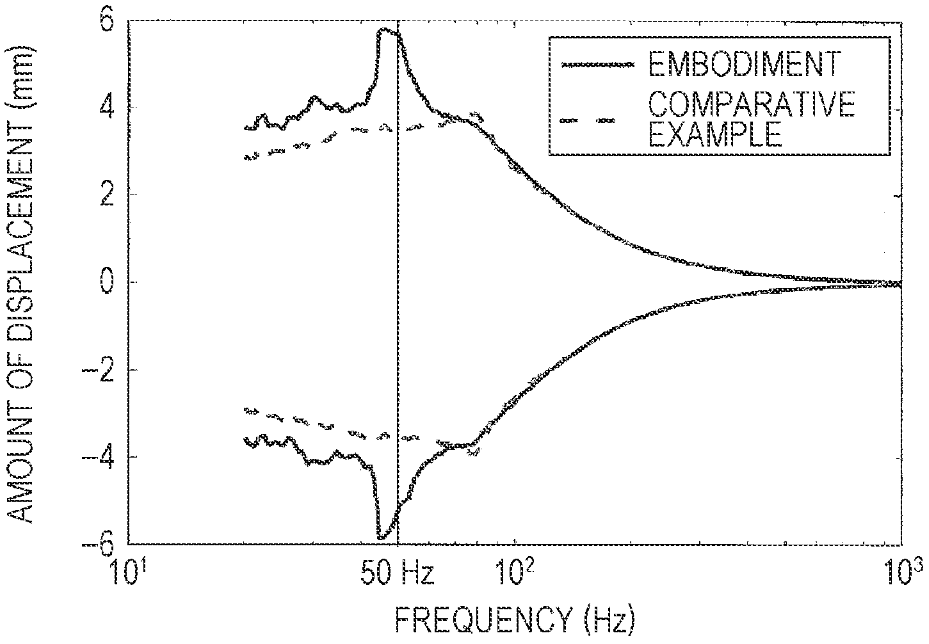
FIG. 9 is a line graph showing the operating characteristics of the speaker in the first embodiment, and the line graph shows a relationship between frequency and the amount of displacement of the voice coil.
Figure 10:
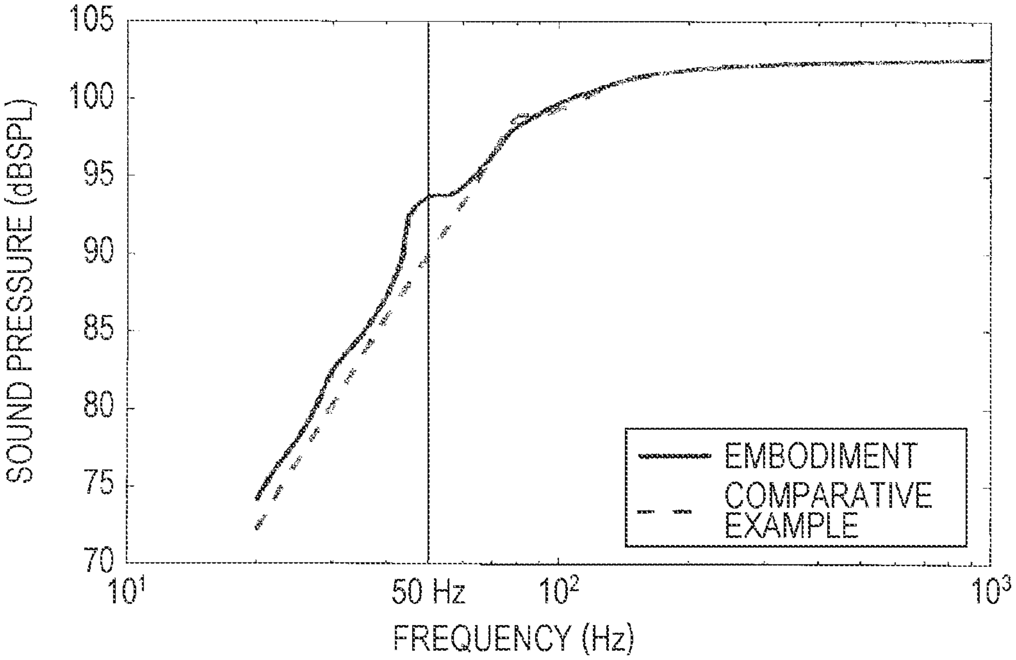
FIG. 10 is a line graph showing the frequency characteristics of the speaker in the first embodiment, and the line graph shows a relationship between frequency and generated sound pressure.

FIG. 9 and FIG. 10 show simulation results of the operating characteristics of the speaker 1 in the embodiment which has the main magnetic gap G1 and two sub-magnetic gaps G2, G3. In FIG. 9, the horizontal axis indicates the frequency of the voice current, and the vertical axis indicates the amount of movement of the voice coil 7. The positive side of the amount of displacement relative to zero as the origin is for the amount of upward (Z1 direction) movement (movement distance), and the negative side is for the amount of downward (Z2 direction) movement (movement distance). In FIG. 9, the solid line indicates a simulation result when vibration control to reverse the direction of the voice current is performed by operating the vibration controller 30. The dashed line indicates a simulation result in a comparative example in which a speaker having the structure shown in FIG. 1 and FIG. 2 is not provided with the vibration controller 30, and control to reverse the output is not performed. The simulated speaker has a resonance frequency of 50 Hz. From the line graph shown in FIG. 9, it can be verified that, unlike a comparative example in which a current reverse process is not performed, in the embodiment in which the direction of current is reversed, a braking force is not applied to the vibrator in the bass range, and the vibrator is operated with a large amplitude.

FIG. 10 shows the frequency characteristics of the same speaker used in the simulation of FIG. 9, where the horizontal axis indicates the frequency, and the vertical axis indicates the sound pressure (dB). In FIG. 10, the characteristics of the speaker 1 in the embodiment is indicated by a solid line, and the characteristics of a comparative example which is not provided with the vibration controller 30 is indicated by a dashed line. From the simulation result of FIG. 10, it can be verified that a braking force is not applied to the vibrator around 50 Hz, which is a resonance frequency, thus the frequency characteristics have been improved.

Figure 11:
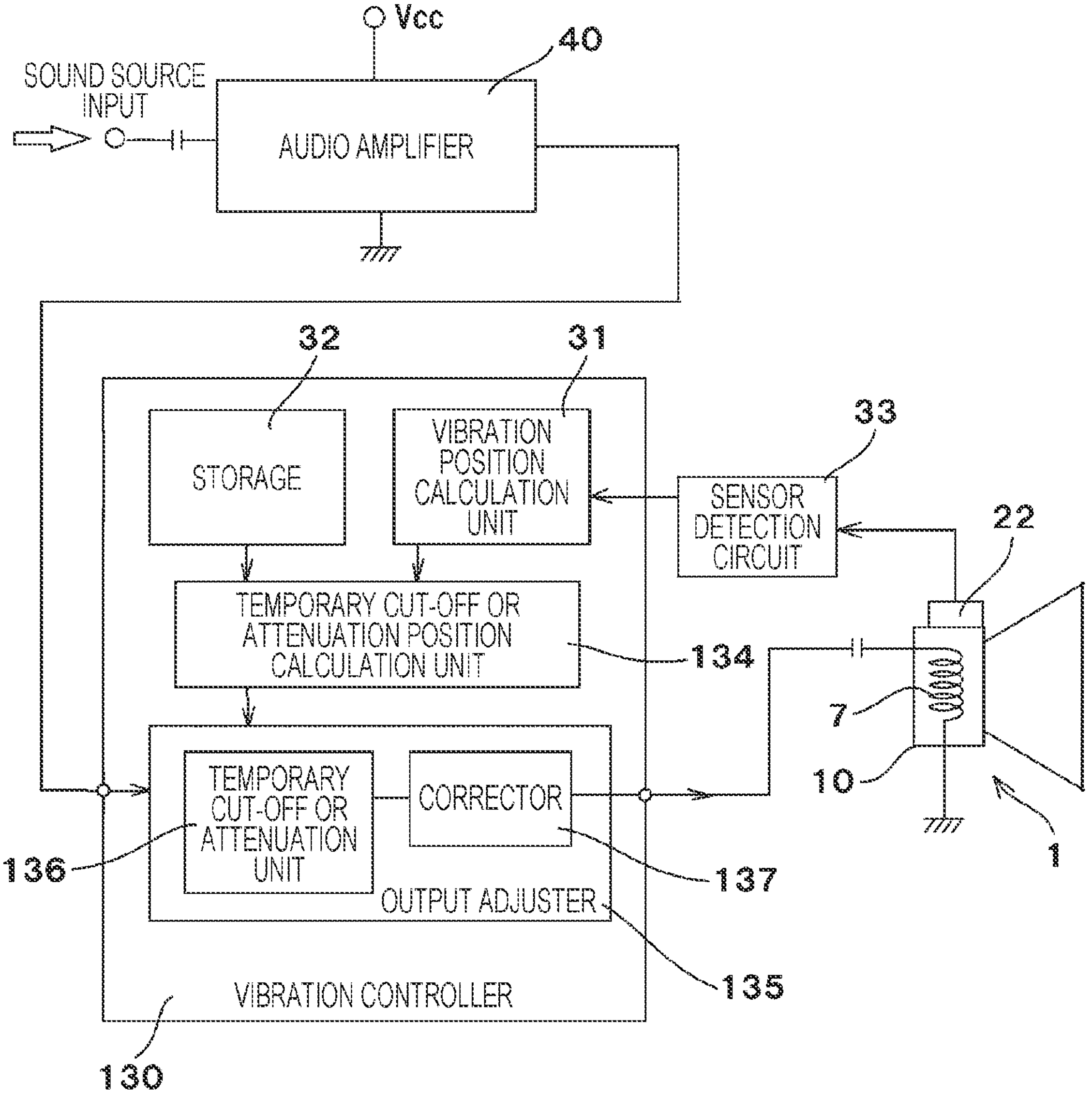
FIG. 11 is a circuit block diagram showing a speaker in a second embodiment of the present disclosure.

FIG. 11 shows a second embodiment of the present disclosure. In the speaker in the second embodiment, the structure of the magnetic circuit section 10 is the same as shown in FIG. 1 and FIG. 2; however, a vibration controller 130 different from that shown in FIG. 4 is used. The vibration controller 130 shown in FIG. 11 has a region that serves as a temporary cut-off or attenuation unit 136 instead of the reverser 36 shown in FIG. 4. In addition, the vibration controller 130 has a region that serves as a temporary cut-off or attenuation position calculation unit 134 instead of the reverse position calculation unit 34 shown in FIG. 4. Like the vibration controller 30, the vibration controller 130 is primarily comprised of a memory and a CPU, and performs a process based on pre-installed software, for example In the vibration controller 130 shown in FIG. 11, a timing to temporarily cut-off or attenuate the voice current is calculated by the temporary cut-off or attenuation position calculation unit 134 based on the position of the voice coil 7 calculated by the vibration position calculation unit 31, and the behavior information specific to the speaker 1, stored in the storage 32. For example, as shown in FIG. 5C, when the center Oc of the voice coil 7 reaches the intermediate position between the main magnetic gap G1 and the first sub-magnetic gap G2 (or the second sub-magnetic gap G3), the temporary cut-off or attenuation unit 136 temporarily cuts-off or attenuates the voice current based on the audio signal output from the audio amplifier 40 based on the calculation values calculated by the temporary cut-off or attenuation position calculation unit 134. The voice current is temporarily cut-off or attenuated, thus as shown in FIG. 5C and FIG. 5D, when the voice coil 7 approaches or enters the sub-magnetic gap G2 or G3, a braking force applied to the voice coil can be eliminated or reduced by a magnetic flux in an opposite direction through the sub-magnetic gap G2 or G3.

Also, in the vibration controller 130 shown in FIG. 11, when the voice coil 7 returns from the position shown in FIG. 5D to the position or the vicinity of the position shown in FIG. 5C, the operation of the temporary cut-off or attenuation unit 136 is stopped, and the voice current delivered from the audio amplifier 40 is restored to a normal current amount. The output adjuster 135 shown in FIG. 11 is also provided with a corrector 137 such as a limiter, and the operation of the voice coil 7 is corrected. Also, in the vibration control using the vibration controller 130 shown in FIG. 11, the vibration plate 3 can be operated with a large amplitude in the bass range, thus the occurrence of distortion of sound production can be prevented.

In the present disclosure, when the voice coil 7 reaches the middle between the position of FIG. 5B and the position of FIG. 5C, or the middle between the position of FIG. 5C and the position of FIG. 5D, the direction of the voice current may be reversed, temporarily cut-off or attenuated, or as shown in FIG. 5D, when the voice coil 7 starts to enter or enters the sub-magnetic gap G2, the direction of the voice current may be reversed, temporarily cut-off or attenuated.

FIG. 12 shows a speaker 101 in a third embodiment of the present disclosure. A magnetic circuit section 110 is fixed to the lower frame 2*a* of the speaker 101. The magnetic circuit section 110 is such that the first magnet 11, the central plate 13, the second magnet 12, and the top plate 15 are stacked and fixed in that order in the center of a recessed outer peripheral yoke 116 composed of a magnetic metal material. The main magnetic gap G1 is formed between the central plate 13 and the outer peripheral yoke 116, and one sub-magnetic gap G2 is provided between the top plate 15 and the upper yoke 17.

The speaker 101 shown in FIG. 12 is additionally provided with the vibration controller 30 shown in FIG. 4 or the vibration controller 130 shown in FIG. 11. In FIG. 12, when the voice coil 7 moves upward (Z1 direction) from the main magnetic gap G1, and approaches the sub-magnetic gap G2 or enters the sub-magnetic gap G2, the direction of the voice current is reversed, or the voice current is temporarily cut-off or attenuated. The speaker 101 shown in FIG. 12 is provided with the sub-magnetic gap G2 only above the main magnetic gap G1, thus is affected by the sub-magnetic gap G2 only when the voice coil 7 moves upward. However, when the voice coil 7 moves upward, the voice current is controlled by the vibration controller shown in FIG. 4 or FIG. 11, thereby making it possible to prevent a braking force from acting on the voice coil 7 by the transverse magnetic flux through the sub-magnetic gap G2, thus the symmetry of the operation can be maintained between when the voice coil 7 vibrates upward and when the voice coil 7 vibrates downward with respect to the position in the main magnetic gap G1, which also can improve the reproduced sound quality.

The preferred embodiments of the present disclosure have been described in detail above. However, the present disclosure is not limited to these specific embodiments, and thus various modifications and alterations can be made in the scope of the gist of the invention in the claims.

What is claimed is:

1. A speaker comprising:

a vibrator having a vibration plate and a voice coil;

a magnetic circuit section configured to form a magnetic flux crossing the voice coil; and, a detector configured to detect a movement of the vibrator, wherein the magnetic circuit section is provided with two magnets disposed with a space in a vibration direction of the voice coil, a main magnetic gap formed in a middle between the two magnets, and a sub-magnetic gap formed spaced from the main magnetic gap with at least one of the magnets interposed between the gaps, wherein between the main magnetic gap and the sub-magnetic gap, directions of magnetic fluxes crossing the voice coil movable inside the gaps are opposite, and wherein a vibration controller is configured to reverse a direction of a current applied to the voice coil, when the detector detects that the voice coil has moved a predetermined distance from the main magnetic gap to the sub-magnetic gap.

2. The speaker according to claim 1, wherein the vibration controller includes a reverser configured to reverse the direction of the current, and a corrector configured to correct a current amount.

3. The speaker according to claim 2, wherein when a central portion of the voice coil in the vibration direction reaches an intermediate position between the main magnetic gap and the sub-magnetic gap, the direction of the current is reversed.

4. The speaker according to claim 1, wherein when a central portion of the voice coil in the vibration direction reaches an intermediate position between the main magnetic gap and the sub-magnetic gap, the direction of the current is reversed.

5. The speaker according to claim 1, wherein the magnetic circuit section has a first sub-magnetic gap formed with a space in one vibration direction and a second sub-magnetic gap formed with a space in the other vibration direction with the main magnetic gap between the first sub-magnetic gap and the second sub-magnetic gap, and a direction of a magnetic flux crossing each of the first sub-magnetic gap and the second sub-magnetic gap is opposite to a direction of a magnetic flux crossing the main magnetic gap, and wherein control by the vibration controller is performed not only when the voice coil has moved a predetermined distance from the main magnetic gap to the first sub-magnetic gap, but also when the voice coil has moved a predetermined distance from the main magnetic gap to the second sub-magnetic gap.

6. A speaker comprising:

a vibrator having a vibration plate and a voice coil;

a magnetic circuit section configured to form a magnetic flux crossing the voice coil; and, a detector configured to detect a movement of the vibrator, wherein the magnetic circuit section is provided with two magnets disposed with a space in a vibration direction of the voice coil, a main magnetic gap formed in a middle between the two magnets, and a sub-magnetic gap formed spaced from the main magnetic gap with at least one of the magnets interposed between the gaps, wherein between the main magnetic gap and the sub-magnetic gap, directions of magnetic fluxes crossing the voice coil movable inside the gaps are opposite, and wherein a vibration controller is configured to temporarily cut-off or attenuate a current applied to the voice coil, when the detector detects that the voice coil has moved a predetermined distance from the main magnetic gap to the sub-magnetic gap.

7. The speaker according to claim 6, wherein the vibration controller includes a corrector configured to correct a current amount.

8. The speaker according to claim 7, wherein when a central portion of the voice coil in the vibration direction reaches an intermediate position between the main magnetic gap and the sub-magnetic gap, the current is temporarily cut-off or attenuated.

9. The speaker according to claim 6, wherein when a central portion of the voice coil in the vibration direction reaches an intermediate position between the main magnetic gap and the sub-magnetic gap, the current is temporarily cut-off or attenuated.

10. The speaker according to claim 6, wherein the magnetic circuit section has a first sub-magnetic gap formed with a space in one vibration direction and a second sub-magnetic gap formed with a space in the other vibration direction with the main magnetic gap between the first sub-magnetic gap and the second sub-magnetic gap, and a direction of a magnetic flux crossing each of the first sub-magnetic gap and the second sub-magnetic gap is opposite to a direction of a magnetic flux crossing the main magnetic gap, and wherein control by the vibration controller is performed not only when the voice coil has moved a predetermined distance from the main magnetic gap to the first sub-magnetic gap, but also when the voice coil has moved a predetermined distance from the main magnetic gap to the second sub-magnetic gap.

* * * * *